United States Patent [19]

Marshall

[11] Patent Number: 5,739,955
[45] Date of Patent: Apr. 14, 1998

[54] HEAD MOUNTED DISPLAY OPTICS

[75] Inventor: Ian Marshall, Hove, Great Britain

[73] Assignee: Virtuality (IP) Limited, Leicester, United Kingdom

[21] Appl. No.: 776,779

[22] PCT Filed: Aug. 10, 1995

[86] PCT No.: PCT/GB95/01891

§ 371 Date: Feb. 10, 1997

§ 102(e) Date: Feb. 10, 1997

[87] PCT Pub. No.: WO96/05532

PCT Pub. Date: Feb. 22, 1996

[30] Foreign Application Priority Data

Aug. 10, 1994 [GB] United Kingdom ............... 9416118
Mar. 1, 1995 [GB] United Kingdom ............... 9504141

[51] Int. Cl.[6] ............................................. G02B 27/14
[52] U.S. Cl. .................................. 359/631; 359/633
[58] Field of Search ................................ 359/633, 631, 359/630, 634

[56] References Cited

U.S. PATENT DOCUMENTS

2,973,683  3/1961  Rowe et al. ........................ 359/633
5,583,695  12/1996  Dobrusskin ....................... 359/633

*Primary Examiner*—David C. Nelms
*Assistant Examiner*—Ricky Mack
*Attorney, Agent, or Firm*—Young & Thompson

[57] ABSTRACT

A head mounted display for use in virtual reality applications and typically in the form of a slim visor is provided with binocular magnifying optics which permit the binocular viewing of an image displayed by a single miniature LCD video screen magnified at infinity focus at left and right exit pupils. A vertically offset beamsplitter is provided having two elements being substantially mutually perpendicular planar semi-reflecting mirrors disposed respectively above or below the horizontal optical axis of the LCD. A single image viewed from the LCD passes through the semi-reflecting mirrors to be reflected off a concave mirror. One reflection part of the image is reflected off one of the elements and then by a right hand fold mirror towards the right hand exit pupil. Another part of the image is similarly reflected off another of the elements and left hand fold mirror towards the left hand exit pupil. Magnification and/or optical correction of the images viewable at eyepoints can be effected by a respective one of lens arrays.

24 Claims, 5 Drawing Sheets

HEAD MOUNTED DISPLAY OPTICS

FIELD OF THE INVENTION

This invention relates to an optics system suitable for a head mounted display apparatus generally and more particularly, but not exclusively, to a head mounted display apparatus comprising an optics system facilitating the binocular viewing of a single LCD screen image.

BACKGROUND OF THE INVENTION

The development of head mounted display apparatus for viewing computer generated imagery has its roots in military aircraft weapons and flight simulation systems. Typically, such systems have required that a computer generated image is projected by means of an optical combiner on to a projection plane or surface overlapping the line of sight of a user, such as for example the curved visor of a helmet. One such example is illustrated in FIG. 8 of U.S. Pat. No. 5,050,966 in which a single cathode ray tube (CRT) mounted in the helmet rearwardly of the user's head feeds a mirrored optical path to a beamsplitting arrangement in the user's line of sight. The beamsplitter enables the user to view with both eyes the projected CRT image and the environment external of the helmet and in his line of sight. It will be understood that the aircraft helmet design can accommodate the described optical apparatus.

However, in many virtual reality applications a helmet of such size would inhibit the movement of a user in the real world when such movement is an integral part of most virtual reality experiences. In addition such designs are inherently complicated by the need to superimpose reasonable images projected from the CRT on to the user's view of the external environment. The design of combiner disclosed in that Specification is constrained by the requirement that the user should be able to view the external environment without eyestrain. As a consequence of this requirement, the design of the associated optics must provide the right performance after allowing for the combiner configuration. Virtual reality applications generally require the widest field of view that is feasible at low cost. If the field of view of the device shown in U.S. Pat. No. 5,050,966 were to be extended above approximately 40 degrees, the optical design would become overly complex due to the necessary first order properties required to illuminate the eye, and the third and higher order properties needed to compensate aberrations.

In virtual reality arcade games applications it has been usual to provide a head mounted display apparatus (HMD) in which a wide field of view is provided by two optical systems each comprising a plurality of lenses and a miniature liquid crystal display screen (LCD) to provide a binocular image to the user. Now that virtual reality games applications are being developed for the home market it is desirable that the unit cost of the HMD is kept to a minimum. LCD's are expensive components and it is desirable that a low-cost HMD comprises only a single LCD feeding a binocular image to the eyes of the user. One such solution is suggested in European Patent Specification No. EP 0 539 907 A2. This specification discloses an HMD shown in FIGS. 2 and 3 which comprises an LCD and magnifying lens mounted forwardly of the nose of a user, a beamsplitter feeding a separate complete image of the LCD respectively to two mirrors each mounted respectively in the line of sight of the user, and further magnifying lenses each mounted intermediate one of the mirrors and its respective eye of the user. It is understood that the arrangement described provides a construction wherein the bulk of optical apparatus disposed forwardly of the eyes is cumbersome.

The arrangement described in European Patent Specification No. 0 539 907 is understood to be fundamentally limited in the field of view that can be projected with adequate performance, by the non-rotationally symmetrical nature of the beamsplitting prism. As a consequence the two eyes of a user perceive images that are projected with different perspectives and the user looking toward the extremities of the field of view will see vertical disparities between the relative size of each of the binocular images. Such disparities are a fundamental property of prismatic beamsplitters and viewing them is well known to cause eye strain. This type of arrangement is therefore limited to projecting a field of view about 15 degrees wide and which results in a restricted, blinkered experience for the user.

An alternative form of head-mounted display apparatus is disclosed in WO-85/04961, which comprises a display screen on which an image can be displayed, and a crossed beamsplitter device which directs light from the display screen into two separate optical paths for viewing of respective images of the display screen at left and right exit pupils. A first optical system relays an image of the display screen towards the beamsplitter device, while a pair of second optical systems magnify and/or collimate the relayed image for viewing at the left and right exit pupils, respectively. In this apparatus, the crossed beamsplitter device takes the form of an X-cube which is traversed only once by the light from the display screen, the first optical system takes the form of a lens sub-assembly, and the second optical systems take the form of concave mirrors.

SUMMARY OF THE INVENTION

According to the present invention, there is provided head-mounted display apparatus of the general type described in the preceding paragraph, but in which the first optical system comprises a concave mirror disposed optically on the opposite side of the beamsplitter device to the display screen, the beamsplitter device comprises two semi-reflecting beamsplitter elements disposed one above the other and mutually inclined, and light from the display screen passes through the beamsplitter elements, is reflected by the concave mirror back towards the beamsplitter device, and is then deflected by the beamsplitter device such that part of said light is reflected by one of the beamsplitter elements towards one of the second optical systems, and such that part of said light is similarly reflected by the other beamsplitter element towards the other of the second optical systems.

In the apparatus of the present invention, the beamsplitter device is traversed twice by the light before reaching the exit pupils. This results in a fundamental difference in the optical properties of the system as compared with that disclosed in WO-85/04961. In particular, the light is subjected to vignetting effects during its two traverses of the beamsplitter device, which one would normally expect to impose technical limitations on the apparatus. However, contrary to these expectations, the applicants have discovered that apparatus according to the present invention can form the basis of a system that is not only light and very compact, but which still enables a wide field of view to be achieved.

In a preferred embodiment, the optical system comprising the beamsplitter device, concave mirror and second optical devices is inclined at an angle to an axis connecting the eyes of a user of the apparatus.

The apparatus can further comprise fold mirrors which receive light reflected by the crossed beamsplitter device and which direct said light towards the second optical systems. The fold mirrors can be planar mirrors, and/or at least some of them can be made adjustable.

Conveniently, each of the second optical systems comprises a lens or lens array. The lens or at least one lens in the lens array can be non-rotationally symmetric about its optical axis.

Desirably, the second optical systems are adjustable to adjust the images transmitted to the exit pupils.

The beamsplitter elements of the crossed beamsplitter device can be substantially mutually perpendicular, and/or each can have a substantially upright planar semi-reflecting surface. Each of the beamsplitter elements can comprise a prism.

Advantageously, one or both of the beamsplitter elements is adjustable to compensate for optical mis-alignment caused by refraction of the light therethrough. Median planes of the beamsplitter elements can be non-parallel.

The display screen can be an LCD video display screen, and is preferably mounted co-axially with the concave mirror.

The apparatus can further comprise baffles to block or absorb unwanted light, and/or means permitting inter-ocular adjustment of the lateral spacing of the left and right exit pupils.

In one particular arrangement, the image as displayed on the display screen is linearly polarised, the beamsplitter device is adapted to reflect one polarisation of light more than another, and a polarisation retarding component (such as a quarter-wave plate) is disposed intermediate the beamsplitter device and the concave mirror, the arrangement being such that the polarisation retarding component enhances the intensity of the light transmitted through and reflected by the beamsplitter elements.

The concave mirror may be spherical or aspherical, and can have a reflecting surface and a refracting surface. The concave mirror may be constituted by an array of lenses and/or mirrors.

Preferably, the apparatus further comprises a moulded frame on which the display screen, beamsplitter device, concave mirror and second optical systems are mounted so as to be accurately positioned relative to one another.

BRIEF DESCRIPTION OF THE DRAWINGS

In the following specific description, all dimensions are given in millimeters and all angles in degrees, unless otherwise stated or inferred. Preferred embodiments of the invention will now be described, by way of example only, with reference to the accompanying drawings, in which.

DESCRIPTION OF THE PREFERRED EMBODIMENTS

Embodiments of the invention will now be described which are in the form of a binocular magnifier comprising a crossed vertically offset beamsplitter having half-silvered mirrored surfaces and further having a single concave mirror. Such a magnifier may be incorporated into a visor type head mounted display suitable for virtual reality applications wherein the image from a LCD video display screen provides an object that can be viewed in binocular fashion through ports or eyepieces of the visor worn by an observer. Alternatively, the binocular magnifier could have other uses and/or applications and any limitations of the claims to use in a head mounted display should not be taken to estop or preclude the applicant from broadening the claims in this or any divisional application derived herefrom to encompass other such uses. Such a magnifier could be used in a wide range of industries where images must be projected at a near infinity conjugate.

Figure 1:
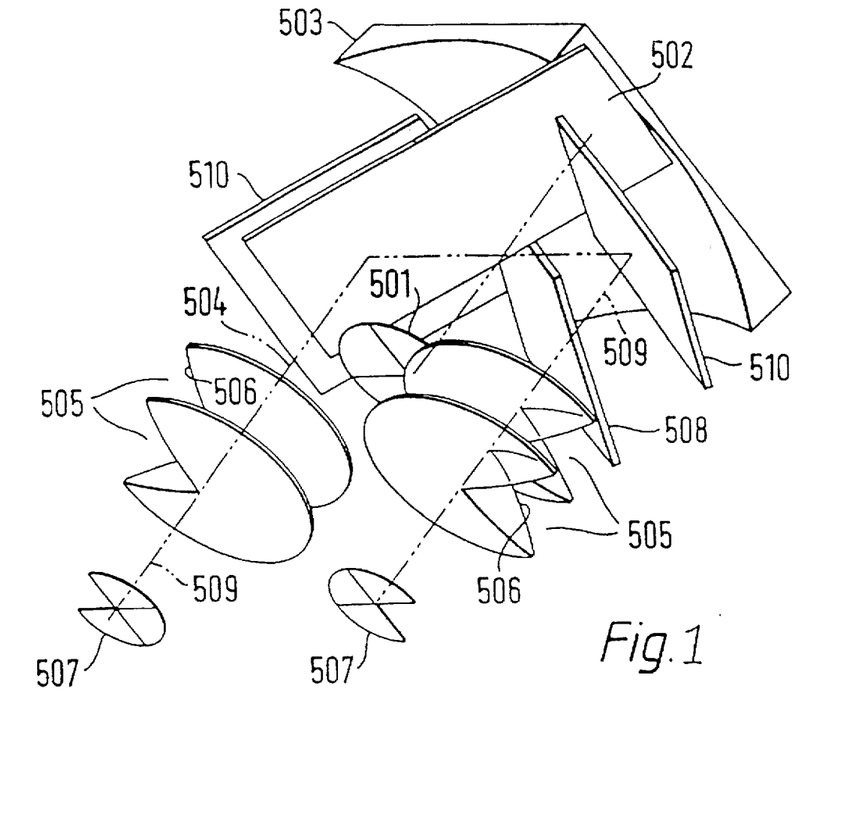
FIG. 1 is a diagrammatic perspective view from the rear of head-mounted display apparatus according to the present invention.
Figure 2:
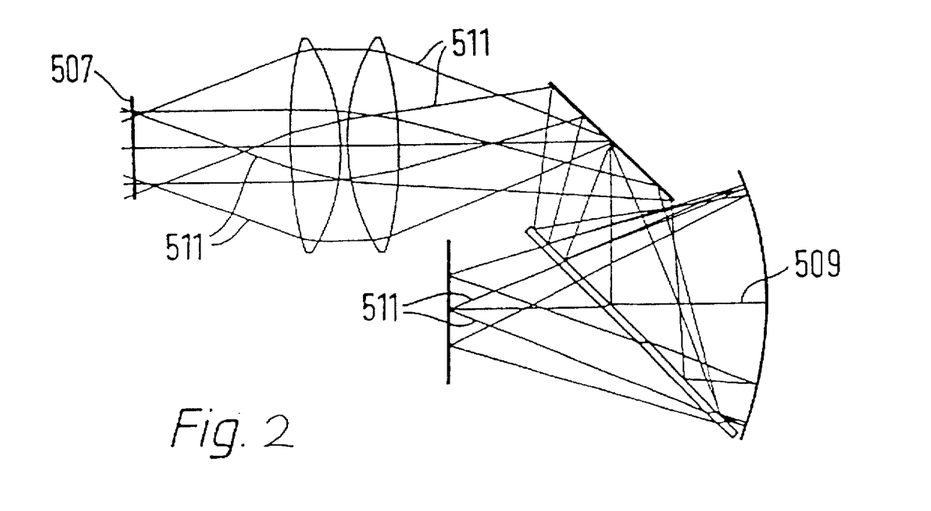
FIG. 2 is a horizontal section through the apparatus of FIG. 1 showing light ray paths.
Figure 3:
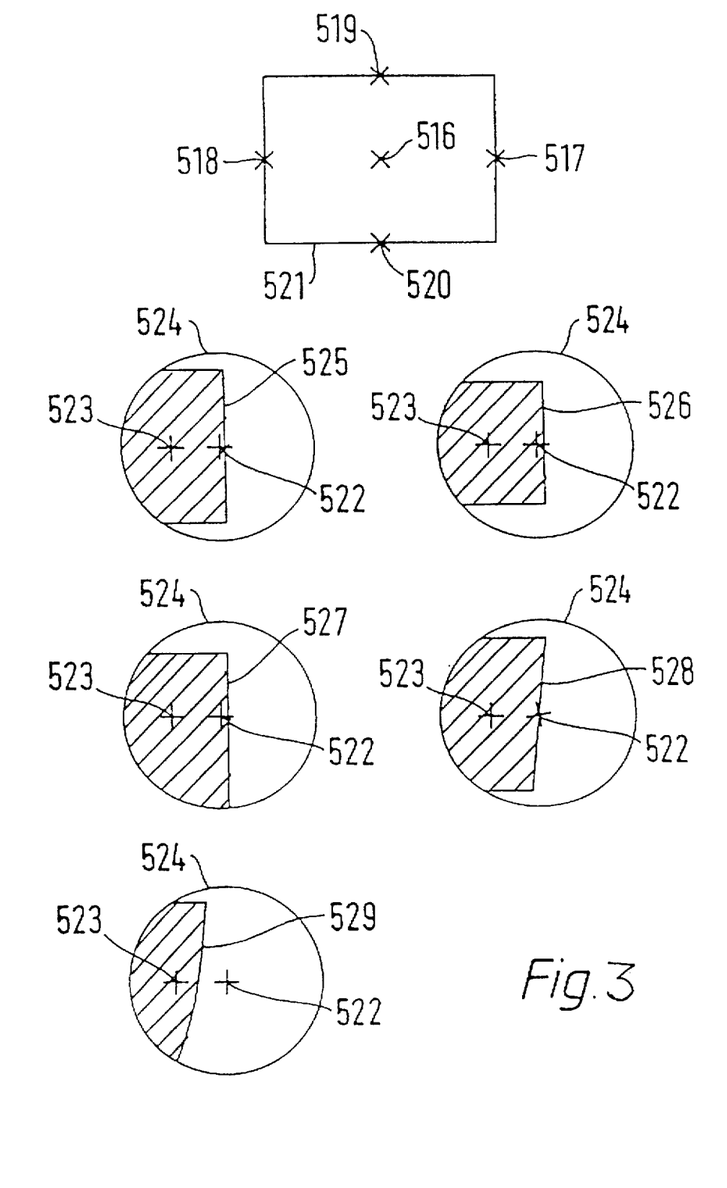
FIG. 3 shows exit pupil shape and size projected through the apparatus from various points on an object.

In the embodiment shown in FIGS. 1, 2 and 3 a viewed object is closer to the observer than a concave mirror, whilst in the embodiment shown in FIGS. 4, 5, 6 and 12 the object is farther from the observer than the concave mirror. The following description relates to both of these embodiments and consequently like numerals denote like parts in the corresponding drawings.

For the purpose of easing calculation of ray paths through embodiments of the invention and for defining relative positions of optical components, the optical axis is defined as a ray that leaves the exit pupil in a direction that is normal to said exit pupil and is traced in the reverse direction to the point of projection backwards through the described optical design by normal refraction and reflection. Two such optical axes exist, i.e. relating respectively to left and right exit pupils.

These ray paths are a mathematical model rather than actually occurring in practice as the apertures of the beamsplitters vignette and obstruct them. As will be described use of a vertically offset beamsplitter arrangement results in the shape of projected exit pupils being non-symmetrical about the respective optical axes.

With reference to FIGS. 1, 2, 5 and 6, light from an object 501 that is projected into one of two eyes of an observer passes through a semi-reflecting beamsplitter 502 and impinges on a spherical or aspherical concave mirror 503 that reflects and focuses an image of the object. A magnified aerial image of object 501 is formed near to point 504 on an optical axis 509 being typically the optical axis of the observer's said one eye. The light reflected from the concave mirror 503 impinges again upon the semi-reflecting beamsplitter 502, where part of it is reflected at near 90° to its original path. The reflected image is projected by a plane fold mirror 510 into an associated eyepiece sub-assembly 505, which is formed by two identical lenses 506 (shown part cut away). The eyepiece sub-assembly 505 collimates and projects the aerial image 504 into the eye thereby forming an exit pupil 507 as a real image of the combined shape of the concave mirror and beamsplitter. A second semi-reflecting beamsplitter 508 is disposed immediately below the first beamsplitter 502 with their respective half-silvered mirrored surfaces being mutually substantially perpendicular each being disposed vertically. The beamsplitter 508 reflects the optical axis 509 in the opposite direction to that effected by beamsplitter 502. It will be understood that beamsplitters 502, 508 together form a crossed vertically offset beamsplitter, with its mirrored surfaces being half-silvered, i.e. permitting light transmission in one direction and light reflection in the other.

Should the observer perceive light traversing the binocular magnifier along unwanted paths, so that resultant images are misaligned or out of focus with other images, then thin and flat light baffles can be placed adjacent the beamsplitter 502 and 508 to block unwanted rays. Light that is reflected into the top of the wrong eyepiece by the beamsplitter 502 can be blocked by placing a thin baffle that is aligned normal to the object and vignettes the top half of the optical path. Light that is correctly reflected by beamsplitter 508 will then pass underneath the said baffle. Similarly, a baffle can be placed near beamsplitter 508 to block unwanted reflections into the bottom optical path. Light that is transmitted through one beamsplitter and reflected by the other can be blocked by a baffle that is aligned horizontally and placed between the two beamsplitters 502 and 508.

Figure 6:
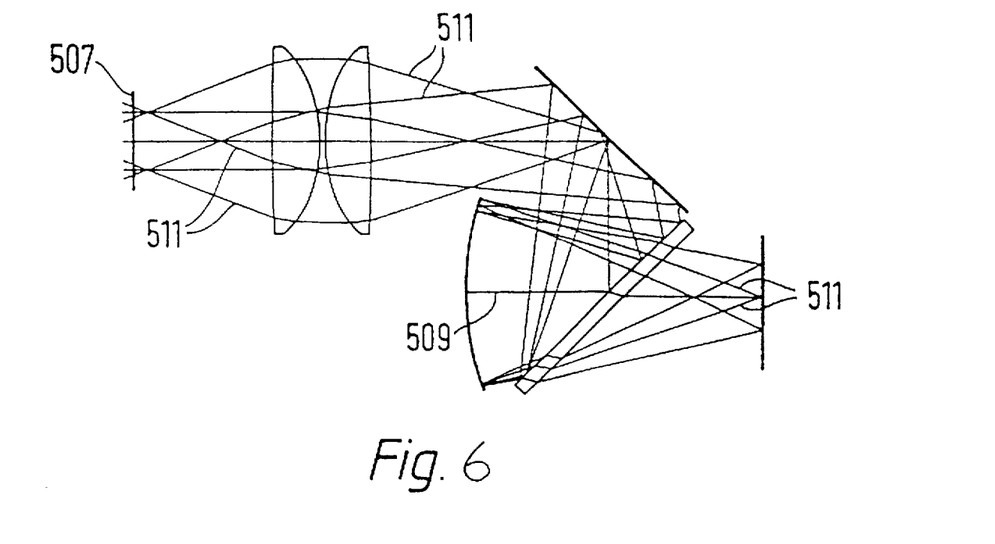
FIG. 6 is a horizontal section through the apparatus of FIG. 5 showing light ray paths.

Referring to FIGS. 2 and 6, the horizontal widths of the plane mirrors 510, the beamsplitters 502, 508 and concave mirror 503 are chosen to project the limiting rays 511 shown without vignetting.

FIG. 3 shows the resultant size of the projected exit pupil, a typical object 521 is shown with five points denoted 516, 517, 518, 519 and 520. The size of the exit pupil is calculated by tracing rays from the exit pupil to each point in turn, and calculating which rays are vignetted by the optical components and which rays are transmitted or reflected. The shaded areas enclosed by the lines 525, 526, 527, 528 and 529 in FIG. 3 show the calculated extent of the exit pupils that are projected respectively from points 516, 517, 518 and 519, and 520 on the object, i.e. point 516 projects the exit pupil 525, point 517 the exit pupil 526, etc.

Circle 524 represents a nominal exit pupil that is 20 millimeters diameter for the design illustrated and which is centred on the optical axis 509. The optical axis 509 intersects the exit pupil at point 522 whereas point 523 is the estimated position for the centre of the observer's eyeball when placed for best viewing of the projected image. Points 522 and 523 are in the same positions in all the diagrams shown.

Orientation of one axis of viewed images is reversed because of the combined effect of the corresponding semi-reflecting beamsplitter 502 or 508 and plane mirror 510. In addition the whole image is inverted by the action of forming an intermediate image (at 504). This can be compensated for by adjusting the image displayed on the LCD object, i.e. it may be reversed so as to face "back to front" thereby reversing the image in one axis only. Alternatively, one axis of the image may be reversed by placing an additional plane mirror in the optical path adjacent the object, or by placing an additional plane mirror in each optical path between "eyepieces" and the respective beamsplitter 502 or 508.

Figure 4:
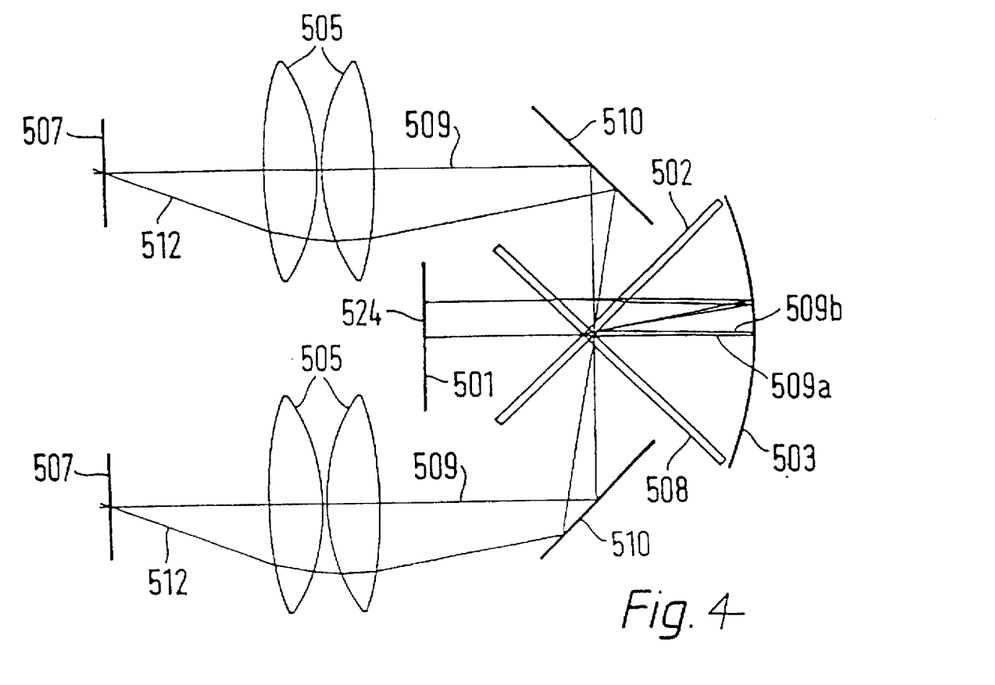
FIG. 4 shows a horizontal section through the apparatus with selected ray paths illustrating the horizontal orientation and alignment of the projected images.
Figure 5:
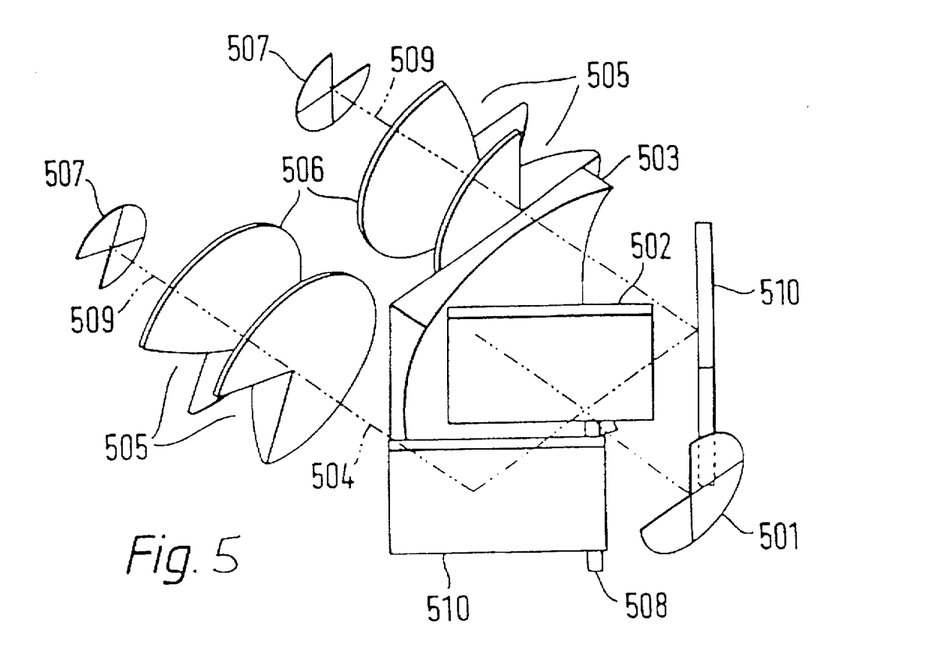
FIG. 5 is a diagrammatic perspective view from the front of an alternative embodiment of head-mounted display apparatus according to the present invention.

In FIG. 4 there are illustrated parallel images seen by the observer's eyes. In this third embodiment the beamsplitters 502 and 508 are not precisely mutually perpendicular thereby correcting a horizontal offset induced by refraction through the beamsplitters. The optical axes 509 are traced in parallel directions from the exit pupils 507 backwards to the object, and are reflected off the beamsplitters 502 and 508 in slightly different paths 509a and 509b. These paths 509a and 509b are reflected back through the beamsplitters 502 and 508 by the concave mirror 503 on to the same point in the object 524.

Figure 7:
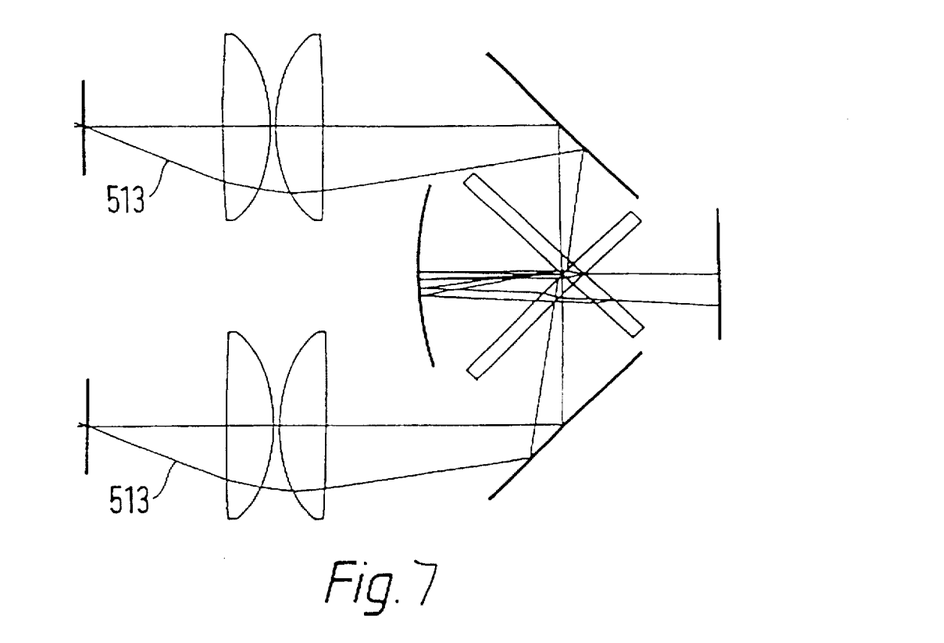
FIG. 7 is a horizontal section through the apparatus of FIG. 5 with selected ray paths showing the horizontal orientation and alignment of the projected images.

In this embodiment, the optical axes 509 are parallel in both halves of the optical system, i.e. corresponding to the left and right eye of the observer, respectively from the exit pupil 507 to the plane mirror 510, and from the plane mirror pupil 507 to the beamsplitter 502 or 508. The horizontal rays 512 enter each eye in parallel directions, and it can be seen that they leave the same point on the object. It is obvious that the vertical orientation of each image is identical. Likewise, the images projected from the fourth embodiment are also parallel, as can be seen from FIG. 7 where horizontal rays 513 leave the same point on the object and enter the left and right eyes in parallel.

In the afore-described embodiments, the light transmission is normally limited to below 25% of the LCD object brightness as the light has to transmit through and reflect off the same beamsplitter in each path. In order to maximise the transmission, both reflection and transmission of each beamsplitter 502, 508 must be as close to 50% as possible. Advantageously, LCD's emit linearly polarised light which can permit an increase in the light transmission if suitable polarising components are used.

Figure 8:
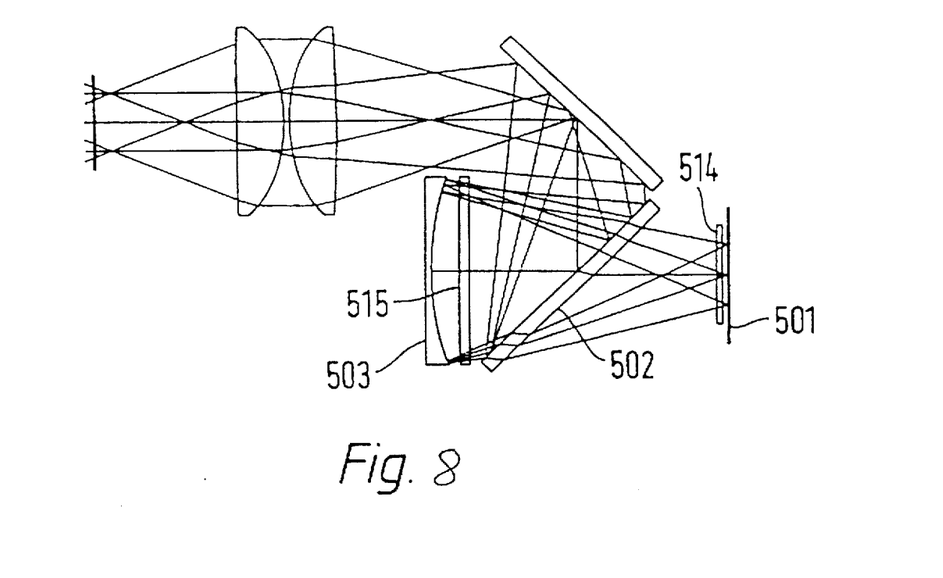
FIG. 8 is a horizontal section through a further embodiment of head-mounted display apparatus according to the present invention, showing the use of polarisation selective components to improve light transmission.

Polarising components can be added to improve transmission as shown in FIG. 8. Here the object in the form of LCD 501 incorporates a linear polariser 514. This typically polarises the light so that the electric field of the LCD is aligned horizontally. Light is transmitted through the now polarising beamsplitter 502 to a quarter wave plate 515 placed in front of the concave mirror 503. The quarter wave plate 515 rotates the plane of polarisation by 90° before it is reflected back to the beamsplitter 502. This new polarisation is selectively reflected by the beamsplitter 502. The beamsplitter coating can be fabricated cheaply from a single layer of an oxide of titanium.

It is not essential that the concave mirror 503 is a single component. In the afore-described embodiments it is a simple spherical surface that reflects the light off a mirrored surface closest to the object. Aberration compensation may be improved by making that said surface aspheric or by adding more optical surfaces. For example, the mirror 503 could have a front refracting surface that transmits the light through to a reflective rear surface. Additionally, one or more lenses could be placed intermediate a concave reflective surface and the LCD object.

Figure 9:
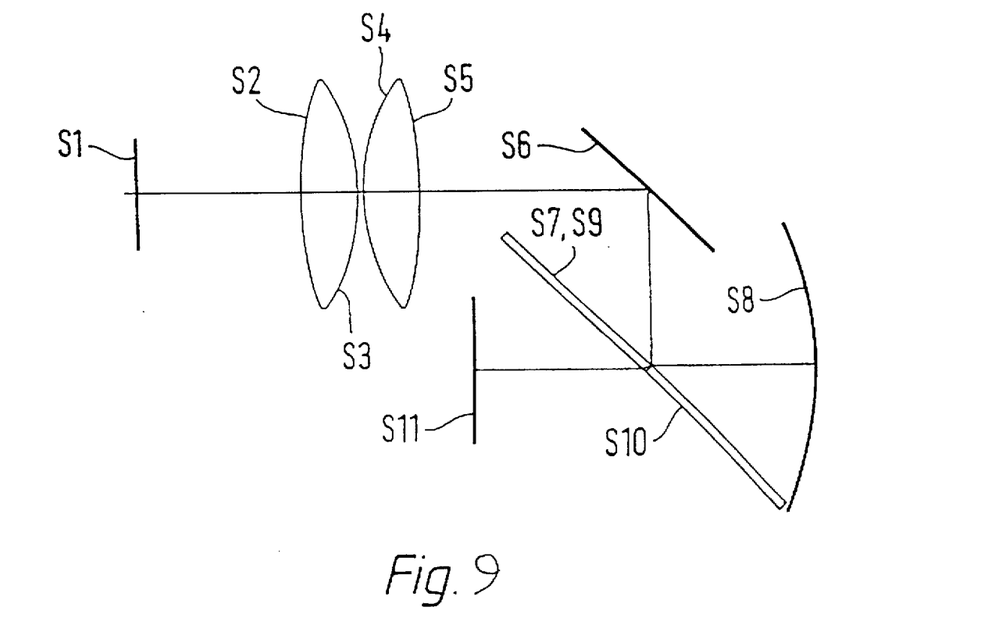
FIG. 9 is a horizontal section through the apparatus showing an example of optical design whose reference numerals are referred to in the following Table A to identify optical surfaces.

The optical construction of one half of the binocular magnifier for the third embodiment is given in the following Table A, which refers to the construction shown in FIG. 9. This table gives the co-ordinates of the positions of the poles, or centres, of each optical surface taken in turn relative to an origin using rectilinear (x, y, z) co-ordinates. The origin is defined as a point on the exit pupil, and the x-axis is defined as being normal to the said exit pupil. Table A consists of nine columns, namely in order:

the surface number as shown in FIG. 9, the optical surface radius of the curvature (positive numbers being convex, negative being concave);

the optical surface aperture size ('d' referring to diameter, alternatively if rectangular 'h' refers to the horizontal dimension whilst 'v' refers to the vertical);

the 'x' co-ordinate of the pole of the optical surface relative to the origin;

the 'y' co-ordinate of the pole of the optical surface relative to the origin;

the 'z' co-ordinate of the pole of the optical surface relative to the origin;

the angle that the optical surface makes to the x-axis of the origin in degrees;

the material defining the space between two optical surfaces, and the refractive index of the aforesaid material at the 587.6 nanometer wavelength of the sodium d line.

The last two columns of Table A refer to the space following the surface number specified i.e. material specified for surface 4(S4) is that found intermediate surfaces 4 and 5 (S4-S5). Surfaces S3 and S4 are identical and aspheric. Table B gives the aspheric coefficients used in later mentioned equation that define the surface. Table C gives the object size and field of view projected from the design given in Table A.

The sag of the surface is defined by the distance to any point on the surface from a plane that is normal to the optical axis and includes the pole of the optical surface. Sag is measured in a direction normal to the said plane. The pole is defined as the point where the optical axis intersects the optical surface. If the distance of any point on the optical surface to the optical axis, in a direction normal to the said optical axis, is defined as 'R', and the sag of the spherical surface defined by the radius specified in Table A is 's', then the sag of the actual asphere is given by the equation:

$$sag = s + [a4 \times R^4] + [a6 \times R^5]$$

where $R^4$ means R raised to the power of 4, $R^5$ means R raised to the power of 5, a4 and a6 are aspheric coefficients and positive coefficients reduce the thickness of the lens.

TABLE C

The Field of View of the Binocular Magnifier Design Given in Table 1

| Horizontal field of view (degrees) | Vertical field of view (degrees) |
|---|---|
| 45.2 | 33.5 |

When the semi-reflecting beamsplitters 502, 508 transmit light, they act as components that are not rotationally symmetrical about the optical axis thereby introducing non-rotationally symmetrical aberrations. Such aberrations can be kept small by using relatively thin beamsplitters 502, 508 fabricated from a material with low refractive index. Consequently, crown glass beamsplitters of less than 3 mm thickness are desirable. The afore-described non-rotational symmetry also deviates the transmitted light paths laterally. Light projected from the centre of the object LCD through the beamsplitters 502, 508 that are aligned horizontally will be deviated horizontally, but light entering the left hand 'eyepiece' will be deviated in the opposite direction to light entering the right hand 'eyepiece'. This results in the light paths projected into each eye from the centre of the object being misaligned unless compensated.

One compensation method is to rotate each eyepiece and plane mirror 510 about the intersection point of the optical axis with the plane mirror, such that the field of view projected into each eye is deviated by an equal and opposite angle to that projected into the opposite eye. This creates an angular difference between the two images that compensates for the angular error introduced by the beamsplitters. Alternatively as afore-described with reference to FIG. 4, the relative angular disposition of beamsplitters 502, 508 may be non-perpendicular to compensate for potential angular misalignment of reflected images.

Embodiments of the current invention offer advantages over conventional optical designs by providing a high mag-

TABLE A

Data Describing a Binocular Magnifier Design

| Surface | Radius | Aperture | X | Y | Z | Angle | Material | Refractive index |
|---|---|---|---|---|---|---|---|---|
| S1 | infinity | 20d | 0 | 0 | 0 | 90 | air | 1 |
| S2 | 73.399 | 42d | 30 | 0 | 0 | 90 | acrylic | 1.490082 |
| S3 | 33.651 | 42d | 40 | 0 | 0 | 90 | air | 1 |
| S4 | 33.651 | 42d | 41 | 0 | 0 | 90 | acrylic | 1.490082 |
| S5 | 73.399 | 42d | 51 | 0 | 0 | 90 | air | 1 |
| S6 | infinity | 32h × 32v | 91 | 0 | 0 | 45 | air | 1 |
| S7 | infinity | 56h × 30v | 95.98 | −36.92 | 15 | 44.6 | air | 1 |
| S8 | −70.722 | 52h × 70v | 121 | −32 | 0 | 90 | air | 1 |
| S9 | infinity | 56h × 30v | 95.98 | −36.92 | 15 | 44.6 | crown glass | 1.522489 |
| S10 | infinity | 56h × 30v | 94.93 | −37.98 | 15 | 44.6 | air | 1 |
| S11 | infinity | 15h × 11v | 59.9 | −32 | 0 | 90 | air | 1 |

TABLE B

Aspheric Coefficients of Surfaces S3 and S4 defined in Table A

| a4 coefficient (units: mm to power −3) | a6 coefficient (units: mm to power −6) |
|---|---|
| −4.901794e − 06 | −3.678384e − 09 | nification of a small object, compact design and wide field of view, whilst using low cost components. Embodiments of the invention described relate to binocular magnification of single objects that are small compared to the interpupillary separation of the eye, i.e. the objects are typically less than 25 mm across. Desirably the projected field of view is greater than 30°. This requires that such an optical design has a focal length of less than 50 mm though more typically 20 mm. Consequently, a conventional 'bi-ocular' magnifier incorporating a separate lens assembly for each eye is not feasible because the separation of the eyes is too large in comparison to the maximum viable focal length.

In the afore-described embodiments the misalignments between two projected images and their respective aberrations are generally sufficiently small to allow an observer to use the devices for long periods of time without eyestrain. It is desirable that adjustment is not required to match the observer's interpupillary separation or for focus. Advantageously, designs in accordance with the invention can project images over sufficiently large exit pupils to remove any need for interpupillary adjustment and with sufficient eye relief (i.e. distance from the last optical surface to the user's eye) to permit the user to wear spectacles.

An advantage provided by the afore-described vertically offset beamsplitters is that the number of times that images are subject to semi-reflection and/or semi-transmission is kept to a minimum thereby improving final image brightness. In the afore-described designs optical components are usually kept symmetrical about a common LCD optical axis (although this is not essential). The respective vertically offset beamsplitters therefore project the top half of viable light paths into one 'eyepiece' and the bottom half into the other 'eyepiece', vignetting the beam accordingly. Each eyepiece projects the image of the object over an exit pupil that is itself a real image of the corresponding concave mirror and beamsplitter.

Thus, each exit pupil, which determines the size of the projected beam at each eye, is halved in size by the lateral offset of the beamsplitters. The top half of the exit pupil is projected into one eye and the bottom half into the other. The axis connecting the centres of the two observer's eyes is 'kept' horizontal by rotating the whole optical design assembly to compensate for any vertical offset and by rotating the LCD object in the opposite sense to keep the displayed image aligned to the horizontal axis.

What is claimed is:

1. Head-mounted display apparatus comprising
 a display screen (501) on which an image is displayed,
 a crossed beamsplitter device (502, 508) which directs light from the display screen into two separate optical paths for viewing of respective images of the display screen at left and right exit pupils (507),
 a first optical system (503) for relaying an image of the display screen towards the beamsplitter device, and
 a pair of second optical systems (505) for magnifying and collimating the relayed image for viewing at the left and right exit pupils, respectively,
 wherein the first optical system comprises a concave mirror (503) disposed optically on the opposite side of the beamsplitter device to the display screen,
 the beamsplitter device comprises two semi-reflecting beamsplitter elements (502, 508) disposed one above the other and mutually inclined, and
 light from the display screen (501) passes through the beamsplitter elements (502, 508), is reflected by the concave mirror (503) back towards the beamsplitter device, and is then deflected by the beamsplitter device such that part of said light is reflected by one of the beamsplitter elements (502) towards one of the second optical systems (505), and such that part of said light is reflected by the other beamsplitter element (508) towards the other of the second optical systems (505).

2. Apparatus according to claim 1, wherein the optical system comprising the beamsplitter device (502, 508), concave mirror (503) and second optical devices (505) is inclined at an angle to an axis connecting the eyes of a user of the apparatus.

3. Apparatus according to claim 1, further comprising fold mirrors (510) which receive light reflected by the crossed beamsplitter device (502, 508) and which direct said light towards the second optical systems (505).

4. Apparatus according to claim 3, wherein the fold mirrors (510) are planar mirrors.

5. Apparatus according to claim 3 or, wherein at least some of the fold mirrors (510) are adjustable.

6. Apparatus according to claim 1, wherein each of the second optical systems (505) comprises a lens (506) or lens array.

7. Apparatus according to claim 6, wherein said lens or at least one lens in said lens array is non-rotationally symmetric about its optical axis.

8. Apparatus according to claim 1, wherein the second optical systems (505) are adjustable to adjust the images transmitted to the exit pupils.

9. Apparatus according to claim 1, wherein the beamsplitter elements (502, 508) of the crossed beamsplitter device are substantially mutually perpendicular.

10. Apparatus according to claim 1, wherein each of the beamsplitter elements (502, 508) has a substantially upright planar semi-reflecting surface.

11. Apparatus according to claim 1, wherein the display screen (501) is an LCD video display screen.

12. Apparatus according to claim 1, wherein the display screen (501) is mounted co-axially with the concave mirror (503).

13. Apparatus according to claim 1, wherein one or both of the beamsplitter elements (502, 508) is adjustable to compensate for optical mis-alignment caused by refraction of the light therethrough.

14. Apparatus according to claim 1, wherein median planes of external surfaces of the beamsplitter elements (502, 508) are non-parallel.

15. Apparatus according to claim 1, further comprising baffles to block or absorb unwanted light.

16. Apparatus according to any preceding claim 1, wherein each of the beamsplitter elements (502, 508) comprises a prism.

17. Apparatus according to claim 1, further comprising means permitting interocular adjustment of the lateral spacing of the left and right exit pupils.

18. Apparatus according to claim 1, wherein the image as displayed on the display screen (501) is linearly polarized, the beamsplitter device (502, 508) is adapted to reflect one polarization of light more than another, and a polarization retarding component (515) is disposed intermediate the beamsplitter device (502, 508) and the concave mirror (503), the arrangement being such that the polarization retarding component (515) enhances the intensity of the light transmitted through and reflected by the beamsplitter elements (502, 508).

19. Apparatus according to claim 18, wherein the polarization retarding component (515) is a quarter-wave plate.

20. Apparatus according to claim 1, wherein the concave mirror (503) is spherical or aspherical.

21. Apparatus according to claim 1, wherein the concave mirror (503) has a reflecting surface and a refracting surface.

22. Apparatus according to claim 1, wherein the concave mirror (503) is constituted by an array of mirrors.

23. Apparatus according to claim 1, further comprising a moulded frame on which the display screen (501), beamsplitter device (502, 508), concave mirror (503) and second optical systems (505) are mounted so as to be accurately positioned relative to one another.

24. Apparatus according to claim 1, wherein the concave mirror is constituted by an array of mirrors and lenses.

* * * * *